United States Patent
Brinker et al.

(10) Patent No.: US 6,536,604 B1
(45) Date of Patent: Mar. 25, 2003

(54) INORGANIC DUAL-LAYER MICROPOROUS SUPPORTED MEMBRANES

(76) Inventors: C. Jeffrey Brinker, 14 Eagle Nest Dr. NE., Albuquerque, NM (US) 87122; Chung-Yi Tsai, 6 Mount Vernon Dr., Apt. C, Vernon, CT (US) 06066; Yungfeng Lu, 1055 N. Capital Ave., #20, San Jose, CA (US) 95133

( * ) Notice: Subject to any disclaimer, the term of this patent is extended or adjusted under 35 U.S.C. 154(b) by 0 days.

(21) Appl. No.: 09/602,579

(22) Filed: Jun. 22, 2000

Related U.S. Application Data (60) Provisional application No. 60/141,148, filed on Jun. 25, 1999.

(51) Int. Cl.$^7$ .............................. B01J 29/00; B01D 39/14
(52) U.S. Cl. ............. 210/490; 210/500.25; 210/500.26; 96/4; 502/60
(58) Field of Search ........................... 210/490, 500.25, 210/500.26; 502/60; 96/4

(56) References Cited

U.S. PATENT DOCUMENTS

| | | | |
|---|---|---|---|
| 4,762,899 A | * 8/1988 | Shirinami | |
| 4,778,499 A | 10/1988 | Beaver | |
| 5,772,735 A | 6/1998 | Sehgal et al. | 95/45 |
| 6,037,292 A | * 3/2000 | Laid et al. | |

OTHER PUBLICATIONS

Spillman, R.W., "Economics of Gas Separation Membranes," *Chemical Engineering Progress*, 85(1) (1989), pp. 41–62.

Baker et al., "Membrane Separation Systems—A Research & Development Needs Assessment," *US DOE Report*, DE–AC01–88ER30133(1990).

Armor, J.N., "Membrane Catalysis: Where Is It Now, What Needs To Be Done", *Catalysis Today*, 25 (3–4) (1995), pp. 199–207.

Tsai et al., "Dense Perovskite La 1–xA'xFe1–yCoyO3–δ (A'=Ba, SR, Ca), Membrane Synthesis, Applications, and Characterization," *Journal of American Ceramic Society*, 81(6) (1998), pp. 1437–1444.

Brinker et al., "Ultramicroporous' Silica–Based Supported Inorganic Membranes", *Journal of Membranes Science*, 77 (1993), pp. 165–179.

Brinker et al., "Sol–gel Strategies for Controlled Porosity Inorganic Materials," *Journal of Membrane Science*, 94 (1994), pp. 85–102.

(List continued on next page.)

*Primary Examiner*—Ana Fortuna
(74) *Attorney, Agent, or Firm*—Dorsey & Whitney LLP

(57) ABSTRACT

The present invention provides for a dual-layer inorganic microporous membrane capable of molecular sieving, and methods for production of the membranes. The inorganic microporous supported membrane includes a porous substrate which supports a first inorganic porous membrane having an average pore size of less than about 25 Å and a second inorganic porous membrane coating the first inorganic membrane having an average pore size of less than about 6 Å. The dual-layered membrane is produced by contacting the porous substrate with a surfactant-template polymeric sol, resulting in a surfactant sol coated membrane support. The surfactant sol coated membrane support is dried, producing a surfactant-templated polymer-coated substrate which is calcined to produce an intermediate layer surfactant-templated membrane. The intermediate layer surfactant-templated membrane is then contacted with a second polymeric sol producing a polymeric sol coated substrate which is dried producing an inorganic polymeric coated substrate. The inorganic polymeric coated substrate is then calcined producing an inorganic dual-layered microporous supported membrane in accordance with the present invention.

14 Claims, 7 Drawing Sheets

OTHER PUBLICATIONS

Raman et al., Organic "Template" Approach to Molecular Sieving Silica Membranes, *Journal of Membrane Science*, 105 (1995), pp. 273–279.

Lange et al, "Formation and Characterization of Supported Miceoporous Ceramic Membranes Prepared by Sol–Gel Modification Techniques," *Journal of Membrane Science*, 99 (1995), pp. 57–75.

de Vos et al., "Improved Performance of Silica Membranes for Gas Separation," *Journal of Membrane Science*, 143 (1998), pp. 37–51.

Klein et al., "Pore Structures of Sol–Gel Silica Membranes," *Journal of Membrane Science*, 39 (1988), pp. 213–220.

Gavalas et al., "Deposition of $H_2$–Permsellective $S_i$ $O_2$ Films," *Chemical Engineering Science*, 44 (9) (1989), pp. 1829–1835.

Burggraaf et al., "Fundamentals of Inorganic Membrane Science and Technology," 1996, pp. 1–20.

Sehgal R., "Microporous Gas Separation Membranes: Fundamentals, Preparation and Characterization," Ph.D. dissertation, The University of New Mexico (1996).

Buekenhoudt et al., "Fouling Effects of CO2 on Inorganic Membrane Materials," *Fifth International Conference on Inorganic Membrane.*, Ed. S.–I. Nakao (1998), pp. 486–489.

Kusakabe et al., "Formation of a Y–Type Zeolite Membrane on a Porous Alpha–Alumina Tube for Gas Separation," *Ind. Eng. Chem. Res.*, 36(3) (1997), pp. 649–655.

Brinker et al., "Sol–Gel Transition in Simple Silicates," *Journal of Non–Crystalline Solids*, 48 (1982), pp. 47–64.

Hietala et al., "Pore Structure Characterization of Thin Films Using a Surface Acoustic Wave/Volumetric Adsorption Technique," *Langmuir*, 9 (1993), pp. 249–251.

Tsai et al., "Silica Gas Separation Membranes Prepared with Surfactant–Templated Sublayers," *Proc Fifth Int. Conf. On Inorg. Memb.*, Ed. S.–I., Nakao (1998), pp. 180–183.

Lu et al., "Continuous Formation of Supported Cubic and Hexagonal Mesoporous Films by Sol–Gel Dip–Coating," *Nature*, 389 (1997), pp. 364–368.

R. Quinn, "A Repair Technique for Acid Gas Selective Polyelectrolyte Membranes," *Journal of Membrane Science*, 139 (1) (1998), pp. 97–102.

White et al., "Properties of a Polyimide Gas Separation Membrane in Natural Gas Streams," *Journal of Membrane Science*, 103 (1–2) (1995), pp. 73–82.

M.D. Thouless, "Decohesion of Films with Axisymmetries," *Acta Metall*, 36(12) (1988), pp. 3131–3135.

* cited by examiner

FIG_1

FIG_2

FIG_3A  FIG_3B

FIG_4

FIG_6

*FIG_5A*

*FIG_5B*

FIG_7A

FIG_7B

FIG_8

FIG_9

FIG_10A

FIG_10B

FIG_11

FIG_12

INORGANIC DUAL-LAYER MICROPOROUS SUPPORTED MEMBRANES

PRIORITY APPLICATION

This application claims priority to Provisional Application Ser. No. 60/141,148 filed Jun. 25, 1999.

ACKNOWLEDGEMENT OF GOVERNMENT RIGHTS

This invention was made with Government support at Sandia National Laboratories under Contract No. DE-AC04-94AL85000 awarded by the Department of Energy. The Government has certain rights in this invention.

FIELD OF THE INVENTION

The present invention relates to membranes for use in molecular sieving, and more particularly to inorganic membranes providing high sieving flux and selectivity.

BACKGROUND

Membrane-based separations are energy efficient and cost effective. They represent promising alternatives to energy-intensive distillation, cryogenic separation, or pressure swing adsorption in applications such as purification of sub-quality natural gas, air separation, removal of VOCs and $NO_x$, and hydrogen recovery from processing gases and feed stocks. Microporous inorganic membranes have attracted considerable attention for gas separation due to their excellent thermal and chemical stability, good erosion resistance and high pressure stability compared to conventional polymeric membranes (e.g. cellulusic derivative, polysulfone, polyamide, or polyimide membrane).

An inorganic membrane system generally consists of a macroporous support providing mechanical strength for an overlying thin, either dense or porous, separation membrane. Dense membranes prepared from palladium or perovskite only allow certain gases (such as $H_2$ or $O_2$) to transport via mechanisms such as solution-diffusion or solid-state ionic conduction. Such membranes require high capital investment due to the use of precious metals and/or extreme synthesis conditions. In contrast, porous silica membranes with tunable pore sizes can be processed by a simple dip-coating or spin-coating procedure and can be used potentially in a large variety of gas separations. Microporous silica membranes have been demonstrated to show promising molecular sieving characteristics.

Certain techniques have been developed to process porous silica membranes. They include sol-gel synthesis, leaching, and chemical vapor deposition. Among these, sol-gel processing attracts the most attention do to its excellent processibility and its potential to precisely control pore size and pore structure. Strategies for the fundamental physical and chemical phenomena involved in the deposition of colloidal ceramic dispersions (sols) on porous supports for precise pore size and porosity control have been proposed and discussed in Brinker et al., "Sol-gel Strategies for Controlled Porosity Inorganic Materials," *J. Membr. Sci.*, 94 (1995) 85, incorporated herein by reference. Three keys to membrane production are 1) avoidance of cracks, pinholes or other defects that would reduce the selectivity; 2) precise pore size control (0.3–0.4 nm in diameter) so that separation occurs on the basis of size by molecular filtration or "sieving"; and 3) maximization of the volume fraction porosity and minimization of the membrane thickness to maximize flux.

Forming a microporous silica membrane on top of a home-made disk-shaped, double-coated γ-alumina support has been described in the article De Vos et al., "Improved Performance of Silica Membranes for as Separation," *J Membr. Sci.*, 143 (1–2) (1998) 37–51, incorporated herein by reference. The coating and calcination process was repeated once to minimize potential defects. Both silica sol preparation and membrane processing were similar to those developed by De Lange, Hekdrink and Keizer, described in De Lange et al., "Formation and Characterization of Supported Microporous Ceramic Membranes Prepared by So-Gel Modification Techniques," *J. Membr. Sci.*, 99 (1995) 57–75, incorporated herein by reference. The improvement of membrane performance was attributed to the processing under class-10 clean room conditions, which increases the cost of manufacturing. Prior art membranes have employed repeated-coating processes to reduce intrinsic defects. The multi-step coating process results in reduction of the number of defect sites, thus increasing selectivity but at the expense of permeation flux and cost of manufacturing. Although high selectivity can significantly reduce either feed loss (single stage) or recompression costs (multiple stage), high permeation flux is necessary to achieve commercially satisfactory production rates. Therefore, the deadlock of tradeoff between selectivity and flux needs to be overcome.

SUMMARY OF THE INVENTION

The present invention provides for an inexpensive supported membrane capable of molecular sieving.

The present invention further provides for a uniform intermediate layer on a substrate to allow the deposition of a second, top microporous layer which is relatively defect free and a method for producing the defect free layer.

The present invention also provides for a supported membrane with precise pore size to achieve molecular sieving with maximized flux and selectivity.

There is described a dual-layer inorganic microporous membrane capable of molecular sieving, and methods for production of such membranes. The inorganic microporous supported membrane includes a porous substrate which supports a first inorganic porous membrane having an average pore size of less than about 25 Å and a second inorganic porous membrane coating the first inorganic membrane having an average pore size of less than about 6 Å.

The dual-layered membrane is produced by contacting the porous membrane support with a surfactant-containing inorganic polymeric sol, resulting in a surfactant/inorganic polymer coated membrane support. The surfactant/inorganic polymer coated membrane support is dried, producing a self-assembled surfactant-templated surfactant/inorganic polymer composite film. This supported composite film is calcined to remove the surfactant templates to produce a surfactant-templated micro- or mesoporous membrane substrate, which serves as an intermediate layer surfactant-templated membrane. The intermediate layer surfactant-templated membrane is then contacted with a second inorganic polymeric sol producing an inorganic polymeric sol coated substrate which is dried, producing a supported inorganic polymer coated dual layer structure. This supported dual-layered structure is then calcined to produce a dual-layered microporous supported membrane in accordance with the present invention.

In one embodiment, both of the polymeric sols include silica, aligomers or polymers. The first or intermediate layer of the dual-layer supported membrane generally has a thickness of less than 100 nm and the second or top layer has a thickness of less than about 100 Å. The average pore diameter of the dual-layer supported membrane gradually decreases in size from about 40 to 60 Å for the support, to about 10 to 25 Å for the intermediate layer, to about 2 to 5 Å for the top microporous layer.

The calcining procedure of the second, top layer includes calcining under a vacuum of less than about 4 psia at a temperature of between 200 to 400° C. and further calcining at a temperature of between 300 to 600° C. The calcining of the first or intermediate layer involves calcining at a temperature between 100 to 150° C. and further heating between 500 to 600° C. The drying of the sols involves drying under conditions of low relative pressure of the liquid constituents.

BRIEF DESCRIPTION OF THE DRAWINGS

These and various other features and advantages of the present invention will be apparent upon reading of the following detailed description in conjunction with the accompanying drawings, where.

DETAILED DESCRIPTION

In one embodiment, the present invention provides for novel inorganic dual-layered microporous supported membranes and methods for fabricating the supported dual-layer membranes. The dual-layer membranes are constructed by utilizing an underlying support structure coated with a surfactant-templated micro or mesoporous intermediate layer, then coated with a top selective microporous layer. In the production of supported membranes, the quality of the underlying support determines, to a high degree, the properties and quality of the top selective microporous silica membrane. Supports with rough and large-pore surfaces can cause overlying derived membranes to crack due to stress development on uneven film coatings or serve to create pin-holes (areas not coated by the overlying microporous layer). Therefore, the present invention provides a novel and efficient way for the modification of support surfaces to allow a stable, even, and substantially defect-free subsequently deposited overlying microporous membrane. Mechanical polishing to remove surface roughness is tedious, requiring repeated processes, and is difficult to perform within the interior of tubular supports. In the present invention, a membrane, such as a tube-side γ-alumina surface of a commercial asymmetric membrane support, is modified with a layer of surfactant-templated material, for example, surfactant-templated microporous or mesoporous silica (STS). The STS, configured with high porosity and narrow pore diameter distribution (~1–2 nm), is designed to minimize additional flow resistance, surface roughness, and inherent support defects. It also reduces penetration of a subsequently deposited top layer into the support, thereby reducing the effective thickness of the top layer. This new dual-layer approach creates a thin defect-free microporous membrane with both higher selectivity and higher flux than achieved by the corresponding single-layer microporous membrane.

The present invention provides for supported inorganic membranes capable of molecular sieving, as well as methods for their preparation and use. In one embodiment, the subject inorganic membranes have pores with resulting average pore diameters of less than about 10 Å and usually less than about 5 Å and have a narrow pore diameter distribution. The subject membranes are prepared by initially coating a porous substrate with a surfactant-templated inorganic polymeric sol. After deposition, the surfactant sol coated substrate is dried and calcined to provide the intermediate inorganic membrane. The intermediate inorganic membrane is then coated by a second polymeric sol. After deposition, the inorganic polymeric sol coated substrate is dried, preferably under conditions of low relative pressure of the liquid constituents of the sol, and calcined to provide the subject inorganic dual-layered microporous supported membrane.

The inorganic polymeric sols which find use in the present invention are those sols which are stable under the conditions in which they are employed, and have a viscosity which provides for deposition of a thin sol coating on the support. The viscosity of the sols will generally range from about 1 to 20 cps, usually from about 1 to 5 cps, more usually from about 1.2 to 1.5 cps.

The polymeric sols will comprise a colloidal dispersion of inorganic polymers in a liquid, where the liquid may be a single component, e.g. $H_2O$ or an alcohol, or a multi-component, normally miscible, mixture, e.g. alcohol-water and the like. The inorganic polymers will often have a low mass fractal dimension ($D_f$) and be sufficiently large so that the inorganic polymers are captured, at least in part, on top of the underlying STS substrate. The diameter of the inorganic polymers as measured by small angle scattering will often be at least equal to, and will usually be greater than, the diameter of the pores in the underlying STS substrate, and may be up to 2 times the diameter, more usually up to 1.5 times the diameter of the pores of the underlying STS substrate. The concentration of the inorganic polymers in the liquid component of the sols will be sufficient to provide for a sol with the desired viscosity, as described above. Generally, the concentration of the inorganic polymers in the liquid component of the sols will range from 0.45 to 0.69, usually 0.59 to 0.63, more usually 0.60 to 0.62 moles/liter.

The liquid component of the sols will often comprise water in combination with at least one, usually not more than three, more usually not more than two, organic solvents. Water present in the liquid component will usually be deionized and will be present in about 2.5% to 13% (v/v), usually 5.7 to 6.0% (v/v) of the total liquid component of the sols. A variety of organic solvents will normally be combined with the water to produce the liquid component of the sols. At least one of the organic solvents will be an alkanol, usually a lower alkanol of from 2 to 8 carbon atoms, usually 2 to 6 carbon atoms, more usually 2 to 4 carbon atoms. The alkanol may be an alcohol or polyol, where the number of hydroxy groups does not exceed the number of carbon atoms, and where there is usually not more than one hydroxy group for every 1.5 carbon atoms. Illustrative alkanols which find use as organic solvents in the subject sols are ethanol, usually absolute ethanol, methanol, iso-propanol, and the like. The alkanol will be present in the liquid component of the sols in an amount ranging from about 77 to 82%(v/v), usually from about 80 to 80.5%(v/v) of the liquid component in the sols. Generally, the ratio of alkanol to water in the liquid component of the sols will range from 6 to 32, usually from about 13.5 to 14.5. Other organic solvents, in addition to the alkanol, may also be present in the subject sols, where the liquid component of the sols comprises more than one organic solvent. These other organic solvents may be straight chained, branched or cyclic, and will usually comprise from about 2 to 10 carbon atoms, more usually 4 to 8 carbon atoms. The organic solvents may comprise one or more heteroatoms, usually not more than three heteroatoms, where the heteroatom may be selected from oxygen, sulfur, nitrogen and the like. Illustrative non-alkanol organic solvents which may be present in the liquid component of the sols include hexane, toluene, tetrahydrofuran, acetone and the like. When present in the subject sols, these non-alkanol organic solvents will be present in amounts ranging from 5 to 99% (v/v) of the total liquid component.

The subject inorganic polymeric coating sols are prepared by combining metal alkoxide monomers with the liquid components of the sols, as described above, in the presence of a catalyst, either acid or base, with agitation to provide a substantially uniform dispersion of the metal alkoxide monomers in the liquid components. Metal alkoxide monomers that find use in preparation of the subject sols are those monomers having the formula:

wherein:

M is a metal having a coordination number in excess of 3, i.e.>3, and is selected from the group comprising Si, Al, Ti, Zr and the like, preferably Si;

OR is a hydrolyzable alkoxy ligand, where R usually has the formula:

wherein:

z is from 1 to 4, usually from 1 to 2;

n is usually from 3 to 4; and

R' is a non-hydrolyzable organic ligand or other oligomeric oxoalkoxide having from 1 to 4 carbon atoms, usually from 1 to 2 carbon atoms.

For electropositive metals, e.g. Ti and Zr, the metal alkoxide monomer may be modified to reduce the effective functionality and/or rate of hydrolysis and condensation and thereby prevent particle formation under the sol preparation conditions. To reduce the effective functionality and/or rate of hydrolysis and condensation, the metal alkoxides may be modified by any convenient means, such as chelation with slowly hydrolyzing multidentate ligands, e.g. actylacetonate, alcohol amines, and the like.

Catalysts that find use include mineral acids and bases, including HCl, $H_2SO_4$, $HNO_3$, $NH_4OH$, and the like. In the present invention, often the catalyst is added in sufficient concentration to cause the average condensation rate of the hydrolyzed alkoxide species to be minimized.

Agitation of the metal alkoxide, water, catalyst and organic solvent(s), i.e. the sol precursors, is maintained for a sufficient time to provide for a uniform dispersion of the metal alkoxide in the liquid constituents. Usually the sol precursors will be mixed for a period of time ranging from 5 to 20 min, more usually 14 to 15 min. Mixing may be accomplished by any convenient means, such as stirring, shaking and the like.

The resultant mixture of sol precursors is then allowed to set or age for a sufficient time under conditions of low condensation rate to produce a sol comprising inorganic polymers having the desired cluster size. The condensation conditions, i.e. the rate at which the monomers are hydrolyzed and then condensed into the polymeric clusters, depends on a variety of factors, such as the reactivity of the alkoxy ligands of the metal alkoxide monomers, the temperature at which the sol is maintained, the pH of the sol precursor, and the like. Thus, the temperature and pH of the combined sol precursors will be selected in view of the reactivity of the alkoxy ligands of the metal alkoxy monomers, to achieve conditions of low but finite condensation rate. Although the selected temperature and pH will vary depending on the particular metal alkoxy monomers employed, generally the temperature will range from about 35 to 70° C., usually from about 40 to 60° C., and more usually from about 48 to 52° C. The temperature of the aging precursor sol may be controlled using any convenient temperature control means, such as a heating or cooling means, or the like. The effective pH of the sol precursor composition will generally range from 0 to 5, usually from about 1 to 3, more usually from about 1.5 to 2.5. For silica sols, the pH of the precursor solution may be controlled by introducing to the precursor an acid or basic catalyst, such as HCl, $HNO_3$, $NH_4OH$ and the like, in sufficient amount to modulate the pH (specifically the $-\log[H_3O^+]$) of the precursor to the desired value.

The precursor sol is sealed and allowed to set or age under the conditions of low condensation rate for a period of time sufficient to provide for the formation of extended polymeric networks capable of interpenetration and optionally having the desired fractal dimensions. Usually, the sols will be allowed to set in a closed container for a period of time ranging from about 0 to 140 hrs, more usually from about 10 to 24 hours.

The preparation of a silica polymeric coating sols includes a two stage process, in which the pH of the sols is decreased from the first to the second stage. In the first stage of this two stage sol production process, a silicon alkoxide, e.g. tetraethoxysilane, is combined with an alkanol and water with agitation to produce a precursor sol. The amount of silicon alkoxide which is combined with the alkanol and water to produce the precursor sol will range from 1.0 to 2.0 mol/liter, usually from about 1.7 to 2.0 M mol/liter. The amount of alkanol present in the precursor sol will range from 30 to 70% (v/v), usually 45 to 50% (v/v), and the amount of water present in the precursor sol will range from 2 to 10% (v/v), usually 3.5 to 4.5% (v/v). In this first stage, agitation is continued for a period of 30 to 120 min., usually 60 to 90 min. During this first stage, the pH of the precursor sol is maintained at a value between 3 and 6, usually between 4 and 5 as measured by using an indicator strip, by including in the precursor sol a sufficient amount of an acid catalyst. Any convenient acid catalyst may be employed, including $HNO_3$, HCl and the like. In this first stage, the molar ratio of the four components of the sol precursor, i.e. silicon alkoxide:alkanol:water:acid catalyst, will be $0.8–1.2:3.5–4:0.8–1.2:1.0\times10^{-5}–9.0\times10^{-5}$.

In the second stage of the two stage sol preparation process, the pH of the precursor sol will be reduced by ⅓ to ½. To reduce the pH of the precursor sol, a sufficient amount of water and acid catalyst will be introduced to the precursor sol. Following introduction of the water and acid catalyst, the pH of the precursor sol will be reduced to between about 1 and 3, usually between about 1.5 and 2.5. In the second stage, a sufficient amount of water and acid precursor are added to the precursor sol to change the molar ratio of the four components to 0.8–1.2:3.5–4:4.5–5.5:0.001–0.009. Following introduction of the acid catalyst and water, the precursor sol will be agitated for a period of time ranging from 10 to 30 min, usually 10 to 20 min. Following agitation, the precursor sol will be allowed to set or age at an elevated temperature for a period of time sufficient for the coating sol to be produced. Generally, the incubation temperature will range from 40 to 60° C., usually from 45 to 55° C. The setting period will range from 12 to 36 hours, usually 12 to 24 hours. The resultant silica coating sol (referred to below as the A2** sol) may comprise silica polymers of low fractal dimension.

In one embodiment of the present invention, the surfactant-template polymeric sol utilized to form the intermediate layer membrane is further prepared from the precursor sol following substantially similar steps as described above for creating the A2 sol. However, prior to aging and the second stage, a sufficient amount of surfactant powder is added to the unaged precursor sol. Surfactant powders that are used are usually cationic surfactants, for example C6-surfactant of triethylhexylammonium bromide and C16-surfactant of cetyltrimethylammonium bromide. The amount of surfactant powder that is added is between 2 g and 8 g per 100 g sol, usually between 3 g and 5 g per 100 g/sol. Following the addition of the surfactant powder, precursor sol is agitated for a period of time between about 5–30 min., usually between about 10–20 min. Following the addition of the surfactant powder, the surfactant-template sol is completed following substantially similar steps as those of aging and the second stage, described above for the A2 sol.

In one embodiment, the polymeric sols utilized for both the intermediate layer and the top or outer layer are formed from the sol or a derivative of the sol labeled A2** and fully described in detail in U.S. Pat. No. 5,772,735, incorporated herein by reference.

In alternative embodiments, a sol providing substantially similar sieving characteristics as the A2** sol is utilized as the top microporous membrane. The alternative sol consists of five components, i.e., Bis(Triethoxysilyl)Ethane (BTE):silicon alkoxide:alkanol:water:acid catalyst, with a molar ratio being $0.4–1.2:0.1–0.5:3.5–4:4.8–5.4:1.0\times10^{-3}9.0\times10^{-3}$. Further, alternatives to the STS sol include sols containing amphiphilic block-copolymers. The amphiphilic block-copolymers, for example Brij56, $CH_3(CH_2)_{15}(CH_2CH_2O)_{10}OH$, 4 wt %, are utilized as the templating agent in replace of the surfactant in creating the intermediate sol layer, producing ordered mesoporous silica sublayer membranes. The block-copolymer templated silica provides both a high porosity of between 40 to 80%, usually between 50 to 60%, and an ordered cubic structure, resulting in a membrane having an average pore diameter of less than about 30 Å, usually less than 25 Å.

In one embodiment, foreign particles are removed from the sols (both the intermediate and top layer sols) through the filtering of the sols prior to being coated onto a substrate. The top layer or A2** sols are filtered with a 0.2 to 1.0 $\mu$m filter, more usually with a 0.45 $\mu$m filter. The surfactant-template sols are filled with a 0.45 to 2.0 $\mu$m filter, usually with a 1.0 $\mu$m filter. Thus, potentially damaging foreign materials are removed from the sols to further ensure membranes with accurate sieving capabilities.

A variety of substrates may be employed as porous supports for the inorganic membranes. Substrates that may be employed have pore sizes which are sufficiently large such that the substrate itself does not contribute to the sieving properties of the supported membrane. Generally, the pores of the substrate will have diameters at least 5 times larger than the pores of the inorganic films to be deposited on the substrate, normally at least 8 times larger, and not more than 15 times larger, usually not more than 12 times larger than the pores of the inorganic film to be deposited. The substrate pores usually have diameters ranging in size from about 30 to 70 Å, usually from about 40 to 60 Å.

The substrate is constructed of any suitable material that is thermally, chemically and mechanically stable during sol deposition, thermal processing and membrane use including oxides, e.g. $TiO_2$, $Al_2O_3$, $ZrO_2$, hydroxides, e.g. AlOOH, as well as porous metals, such as stainless, and other materials know in the art. The substrates may have any convenient shape, such as square, rectangular and cylindrical, as well as other more complicated shapes, where the shape chosen will depend primarily on the intended use of the final supported inorganic membrane. The substrates may be prepared using methods known in the art, i.e. deposition of particulate sols, or obtained from commercial sources. Commercially available substrates capable of acting as supports for the inorganic films of the subject invention include those available from U.S. Filter, e.g. Membralox® (a cylindrical substrate comprising a $\gamma$-$Al_2O_3$ inside layer having pores ranging in diameter from 40 to 50 Å), Golden Technologies, and the like. As necessary and desirable, prior to use, the substrate may be calcined to eliminate any organic compounds present on the support and to desorb any water from the support. Calcination will generally be carried out at temperatures ranging from 300 to 500° C., usually 350 to 450° C., for a period of time between 15 to 180 min., and usually between 45 to 75 min.

Prior to depositing the STS sublayer onto the membrane supports, the membrane supports are cleaned, usually by ultrasound. The membrane supports are then washed with de-ionized water 1 to 7 times, usually 3 to 5 times. The membrane supports are then calcined at a temperature between 300 and 500° C., usually 350 to 450° C., for a period of time between 15 to 180 min., and usually between 45 to 75 min.

The STS sol is then deposited onto the surface of the membrane support under substantially clean conditions, usually under Class 100 clean conditions, to produce a surfactant sol coated support that is then dried and calcined to yield an STS inorganic intermediate membrane. The drying is performed in an environment having between 10–30% relative humidity, usually having 15–25% relative humidity at a temperature between 10 and 40° C., usually between 20 and 30° C. for a period of time between 5 and 20 minutes, usually between 10 and 15 minutes resulting in a surfactant-template polymeric coated substrate. The calcination is performed by heating the surfactant-template polymeric coated support at a temperature between 50–200° C., usually between 100–150° C. for between 30–120 min., usually between 45–75 min. producing a surfactant-template membrane support. Surfactant removal is then performed by heating the STS membrane support at a temperature between 300 to 700° C., usually between 500–600° C. for between 30–90 min., usually between 45–75 min. producing the intermediate layer surfactant membrane. Deposition of the surfactant intermediate or sublayer is achieved by contacting the membrane support with an STS sol-gel so that the STS sol coats the membrane support in a layer capable of collapsing with drying to produce a thin film. The support membrane may be contacted with the STS sol using any convenient means, such as dip-coating, infiltration, spin-coating, spraying and the like.

In one embodiment, the A2 silica top layer is then deposited onto the surface of the intermediate layer surfactant membrane, using a similar procedure as described above, producing an A2 polymeric sol coated substrate that is then dried and calcined. The drying is performed in an environment having between 10–30% relative humidity, usually having 15–25% relative humidity at a temperature between 10 and 40° C., usually between 20 and 30° C. for a period of time between 5 and 20 minutes, usually between 10 and 15 minutes producing an A2 inorganic polymer coated substrate. The calcination of the A2 coated substrate is. performed under a vacuum of less than about 6 psia (pounds per square inch absolute), usually less than about 4 psia (<4 psia), at a temperature between 200 and 400° C., usually between 250 and 350° C. During calcination, the rate at which the temperature is raised will range from 0.5 to 5° C./min., usually 0.5 to 2° C./min. The coated substrate will be held isothermally at the calcination temperature for a period of time ranging from about 4–8 hours, usually 5–7 hours after which the temperature will be decreased at a rate of 0.5 to 5.0° C./min., usually between about 0.5 to 3.0° C./min. to produce a dual-layered inorganic supported membrane having the A2 top microporous membrane. In an alternative embodiment, further calcination or second calcination is performed on the A2 supported membrane at a temperature between 300–600° C., usually between 400–500° C. in air for 30 to 90 min., usually 45 to 75 min. producing the final A2** inorganic dual-layered microporous supported membrane. The ends or edges of the final permeable membrane are then sealed to prevent any defects or irregularities.

The final porous inorganic membranes are capable of molecular sieving, and exhibit high flux and high selectivity. By capable of molecular sieving is meant that the membranes are capable of exhibiting substantially molecular sieving behavior, where molecular sieving behavior exists when the separation factor for a pair of gases transported through the membrane is greater than the separation factor for the same pair of gases in a membrane characterized by Knudsen diffusion. Thus, in the formula where $\alpha_{A/B}$ (molecular weight B/molecular weight A)$^{1/2}$, where $\alpha_{A/B}$ is the separation factor of a membrane for a pair of gases, in membranes exhibiting Knudsen separation behavior, the separation factor for the pair of gases does not typically exceed 10. As the subject membranes are capable of exhibiting substantially molecular sieving behavior, the separation factor for pairs of gases will in general greatly exceed the Knudsen separation values.

The supported inorganic membranes are substantially defect free, in that they are substantially free of cracks, pinholes and the like. By substantially defect free is meant that the supported inorganic membranes are at least 95% defect free, usually at least 97% defect free, more usually at least 99% defect free. The supported inorganic membranes are thin, ranging in thickness from 10 to 200 nm, usually from 15 to 150 nm and more usually from 20 to 100 nm. Preferably, the thickness of the supported inorganic membranes will be less than about 100 nm. The supported inorganic membranes of the subject invention will have a narrow pore diameter distribution, i.e. there will be little variance in pore diameter. The pore diameter of the subject membranes will be sufficiently small to provide for size exclusion of molecules, i.e. sufficiently small to provide for selective passage of smaller molecules while blocking larger molecules. The STS intermediate layer membrane will have pores with an average diameter, dependent upon the surfactant utilized, generally in the range of about 5 to 30 Å, more usually from about 10 to 25 Å. The A2** membrane will have pores with an average diameters generally in the range of about 1 to 10 Å, usually from about 2 to 5 Å.

Some of the critical issues in the processing of the sol-gel derived silica membranes include eliminating defect formation and controlling pore size. Described below are some of the strategies employed in one embodiment of the membrane formation to eliminate defect formation. First, drying-induced stress as high as 200 MPa in the silica sol system can result in film cracking unless the film thickness is below a critical cracking thickness hc. Through the adjustment of the sol concentration, withdrawal rate or sol aging time to maintain the membrane film thickness below the critical thickness $h_c$ (~4000 Å for A2 sol), cracking is avoided. Second, the membrane is processed under clean conditions to substantially avoid foreign particles causing pinholes. Third, STS intermediate layer is used to eliminate inherent defects on commercially-available supports and to facilitate the formation of subsequently deposited thin selective membranes (e.g. A2 membrane). The STS intermediate layer is designed with both high porosity and low tortuosity to avoid creating additional flow resistance. Examples of strategies for pore size control, include solvent (water) templating, and surfactant-templating. Due to preferential alcohol evaporation during the film deposition or sol contacting process, water is the dominating solvent at the late drying stage. Water molecules confined in the stressed film are used as a template to create pores of molecular dimension needed for molecular sieving. For the surfactant-templating strategy, surfactants, agregates or liquid crystalline mesophases (amphiphilic molecules composed of a hydrophilic head group and hydrophobic tail) are used as templates. Surfactant-templated silicas are high surface area amorphous solids (up to approximately 1400 m²/g) characterized by monosized, often cylindrical pores organized into periodic arrays that often mimic the liquid crystalline mesophases exhibited by surfactant-water systems. Both water and surfactants can be removed by heating to create uniform pores with various dimensions depending on a choice of surfactant.

The resulting inorganic dual-layer membranes find use in a variety of applications, including purification of sub-quality natural gas, removal of $NO_x$ from power-plant flue gas, reduction of greenhouse gases (e.g. $CO_2$) and hydrogen recovery from processing gases or hydrogen purification for fuel-cell applications. The highly selective top layer will, for example, remove $N_2$ and $CO_2$ efficiently from natural gas without suffering from $CO_2$ plasticization commonly seen in dense polymeric membranes or purify $H_2$ from reformate for fuel-cell applications.

The following examples are offered by way of illustration and not by way of limitation.

EXPERIMENTAL

EXAMPLE 1

Synthesis of Micro-/Mesoporous Silica Materials
1.A. Preparation of Silica Polymeric Sols 1.A1.—A silica polymeric sol (labeled A2) was prepared as follows. Preparation of the A2 sol consists of two acid-catalyzed reaction steps designed to minimize the condensation rates of silica species in order to produce weakly branched polymeric clusters that interpenetrate and collapse during film deposition to produce membranes with molecular-sized pores. In the first step an A2 stock solution was prepared from tetraethoxysilane (TEOS) (Kodak), 200 proof ethanol (EtOH), deionized $H_2O$, and 0.07 N HCl (diluted from 'Baker Analyzed® 1 N HCl). The four components were mixed in a molar ratio of $1.0:3.8:1.1:5.0\times10^{-5}$, respectively, and refluxed at 60° C. for 90 min. while stirring at 200 rpm (PMC 730 series DATA-PLATE® or a Whatman DATAPLATE®model 440P programmable digital hot plate/Stirrer, 500 ml Pyrex® resin reaction kettle with lid, Pyrex® 24/40 condenser). The pH of the prepared stock solution was measured using EM Science ColorpHast®pH paper and found to be 4.7. This A2 stock solution is very stable for approximately 90 to 180 days when stored at –30° C. In the second step, additional water and HCl were added into the stock sol. The sol was agitated or hand-shaken for 15 minutes.

1.A.2.—The sol is then aged at 50° C. for 22 hours. The two-step procedure resulted in an A2** standard sol with a final molar ratio of $TEOS:EtOH:H_2O:HCl= 1.0:3.8:5.0:0.004$ (pH=2.0).

1.A.3.—A dip-coating sol was prepared by diluting the A2 standard sol with two times its volume of ethanol. The dip-coating A2 sol was filtered with 0.45 µm filter (Nalgene) prior to dip-coating.

1.A.4.—An alternative silica species to the A2** sol which will also produce membranes with molecular-sized pores is a BTE/TEOS sol. The dip-coating BTE sol is prepared as described above in 1.A.1. with the sol comprising BTE(Bis(Triethoxysilyl)Ethane):TEOS:ethanol:$H_2O$:HCl in a molar ratio of $0.8:0.2:3.8:5.1:5.3\times10^{-3}$.

1.B.—Synthesis of Surfactant-Templated Micro-/Mesoporous Silica Materials

1.B.1.—Synthesis of a C6STS Microporous Silica Material. A surfactant-template silica (STS) sol containing 0.125M C6-surfactant (triethylhexylammonium bromide, Aldrich) silica sol is prepared by adding 0.4 g per 100 g/sol amount of surfactant powder into unaged A2** standard sol as prepared in 1.A.1. The C6STS sol is then aged according to the process of 1.A.2. The C6STS sol is then diluted as described in 1.A.3. with two times its volume of ethanol. The aggregation of the surfactant during drying does not cause any macroscopic phase separations. The C6STS sol is filtered with a 10 µm filter (Nalgene) prior to dip-coating.

1.B.2.—Synthesis of a C16STS Silica Material. A surfactant-template silica sol containing a 4.2 wt % C16-surfactant (cetyltrimethylammonium bromide) is prepared by adding 0.4 g per 100 g/sol amount of surfactant powder into unaged A2** standard sol as prepared in 1.A.2. and follows the process described in preparing the C6STS sol in 1.B.1.

Figure 1:
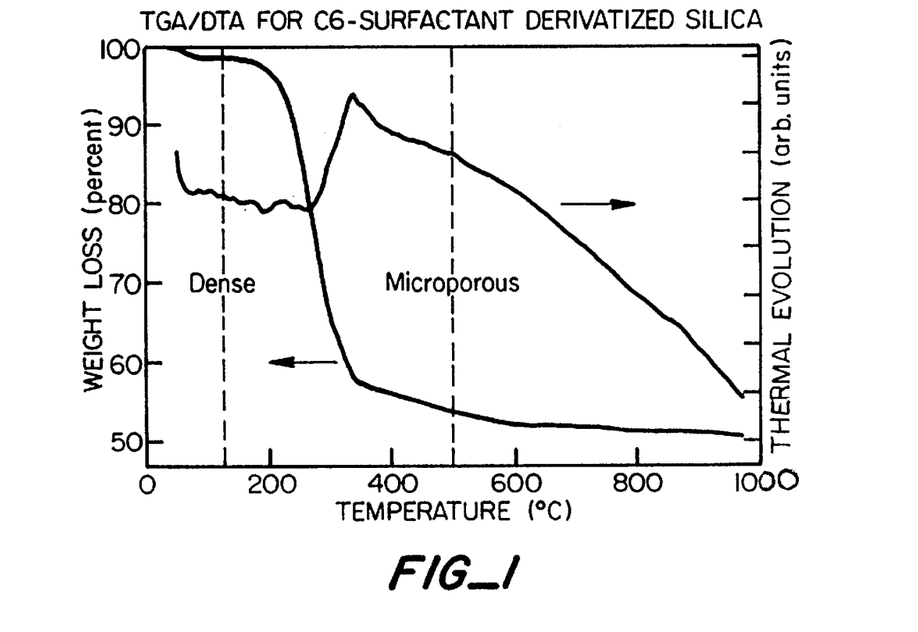
FIG. 1 is a graphical representation of weight loss and differential thermal analysis showing an endotherm peak corresponding to weight loss, indicating decomposition of the surfactant template and the oxidative pyrolysis of surfactant and residual organics.
Figure 2:
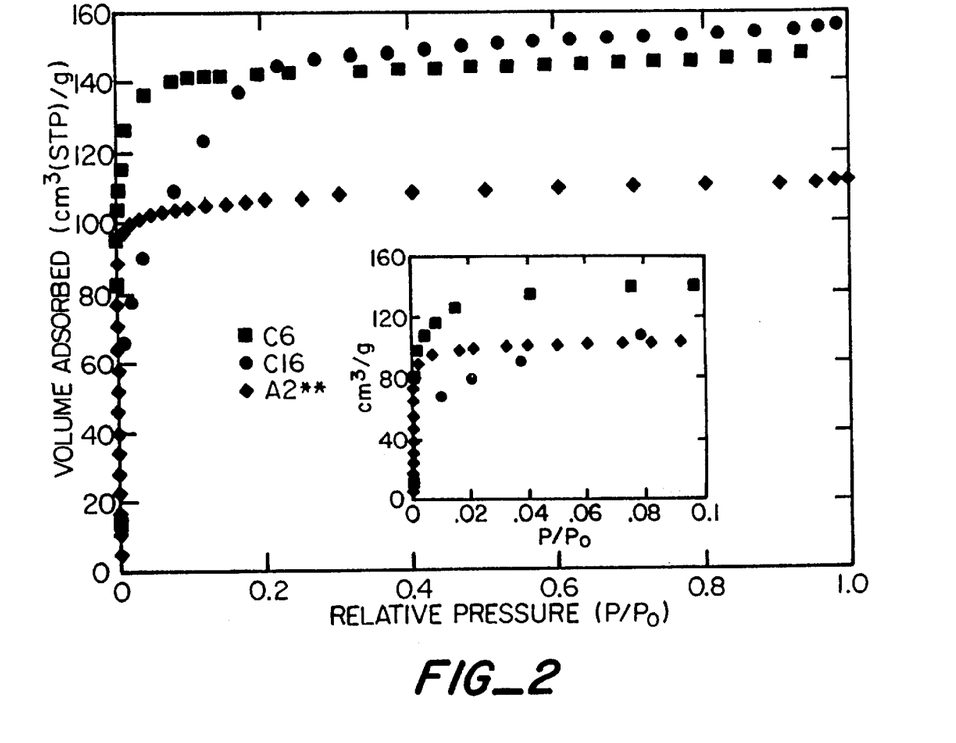
FIG. 2 is a graphical representation of nitrogen adsorption isotherms of three different calcined sol layers after removal of templates.

1.B.3.—Characterization of the STS Intermediate Layer. Referring to FIG. 1, for the C6STS xerogel as prepared in 1.B.1., differential thermal analysis (DTA) showed an endothermic peak near 200° C. corresponding to the beginning of a drastic weight loss indicating the decomposition of the C6-surfactant template while an exothermic peak at around 350° C. accompanied by a weight loss of about 45%, signified the oxidative pyrolysis of surfactant and residual organics. Referring to FIG. 2, $N_2$ sorption isotherms of the calcined C6STS thin film (calcined at 500° C. for one hour), characterized by a surface-acoustic wave (SAW) technique, appeared to be Type I, characteristic of microporous materials; while that of calcined C16STS thin film as prepared in 1.B.2. appeared to be Type II, characteristic of mesoporous materials. Still referring to FIG. 2, although $N_2$ sorption isotherms of bulk calcined A2** xerogel powder appeared to be Type I with a very sharp increase of $N_2$ volume adsorbed within a relative pressure of 0.0 to 0.01, indicating a narrow pore size and pore size distribution, a thin-film form was virtually inaccessible to $N_2$ at 77K due to differences in drying rates (films dry much more rapidly). Average pore diameters of the C6STS and C16STS were about 10–12 Å and 18–20 Å, respectively. Furthermore, the surface area and porosity of the C6STS materials were 575 m²/g and 28%, respectively. Porosity, determined by ellipsometry, agreed with the result calculated from $N_2$ adsorption isotherms.

1.B.4.—Synthesis of a Block Copolymer templated Silica Material. A Brij56, $CH_3(CH_2)_{15}(CH_2CH_2O)_{10}OH$, 4 wt %, amphiphilic block copolymer silica sol is prepared by adding 4 g/100 g sol amount of amphiphilic block copolymer to the unaged A2** standard sol as prepared in 1.A.2. and follows the process described in preparing the C6STS sol in 1.B.1.

1.C.—Sol Deposition

Membrane supports were prepared by sectioning a commercial 50 Å γ-$Al_2O_3$ tube (US filter) into several 5.5 cm-long sections and cleaned by ultrasound. The supports were then washed with de-ionized water 5 times before calcining at 400° C. for 60 min.

1.C.1—Surfactant Sublayer Coating of the Support. A sol-gel dip-coating process featuring aspects of slip casting was performed in a laminar flow (150 ft/min) chamber under clean conditions of Class 100. To prepare a C6STS sublayer, the support tube as prepared and washed in 1.C. was lowered into the sol containing the C6-surfactant as prepared and described above in 1.B.1. at a rate of 8 inches/min. The support was held undisturbed for ten seconds, the support was then withdrawn at the rate of 3 inches/min. The surfactant coated support was then dried at a temperature of 25° C. in a 20% relative humidity environment for 15 minutes resulting in a surfactant-template polymeric layered membrane support. The membrane was then calcined to 120° C.

in a programmable furnace. In performing the calcination, the membrane support was heated at a rate of 1° C./min to the target temperature 120° C. and was held isothermally for 60 min. The coated membrane support was then cooled at a rate of 1° C./min. to 25° C. The cooled membrane support was then confirmed to be substantially impermeable to helium by performing the permeance measurements. The coated support was then subjected to surfactant removal by heating the membrane tube in the programmable furnace at a rate of 1° C./min. to a temperature of 500° C. resulting in the intermediate surfactant membrane support. The membrane was held isothermally for 60 min. then cooled at a rate of 1° C./min. to 25° C. The same procedure could also be used to prepare membranes with other surfactant-templated silica sublayers.

1.C.2—A2 Layer Coating of the Membrane Support. The support tube with the C6STS layer as prepared in 1.C.1. was lowered into the A2 sol as prepared in 1.A. at a rate of 10 inches/min. and left undisturbed for 10 seconds. The membrane support was then withdrawn at a rate of 1 inch/min. The A2 polymeric sol coated substrate was then dried at a temperature of 25° C. in a 20% relative humidity environment for 15 minutes resulting in an A2 layered membrane support. The A2 layered membrane support was then calcined in a programmable furnace under a vacuum condition of less than 4 psia (<4 psia) at a heating rate of 1–2° C./min from room temperature to 300° C. The A2 coated membrane was held isothermally for six hours at 300° C. to evacuate solvents and also promote further pore shrinkage. The A2 coated membrane is then cooled at a rate of 1° C./min. to 25° C. The vacuum calcination procedure also results in the decomposition of surface ethoxy groups; therefore, a hydrophobic inner pore surface is formed as evidenced by an increase in the water contact angle of membrane surface from 17° to 41° C. The imperfections near both ends of the final A2 dual-layered tube membrane caused by being clamped in the laminar flow chamber were then sealed by dense silicone (Duraseal 1529, Cotronics Corp., NY). The fmal permeable length of the A2** coated tube is 4 cm.

1.C.3.—Further calcined A2** membrane. The dual layered membrane as prepared above in 1.C.2. was further calcined, prior to the coating of the imperfections near both ends, at 450° C. by heating the membrane at a rate of 1° C./min. to the target temperature of 450° C., then held isothermally for 60 min. in air and cooled at a rate of 1° C./min. to 25° C.

Figure 3A:
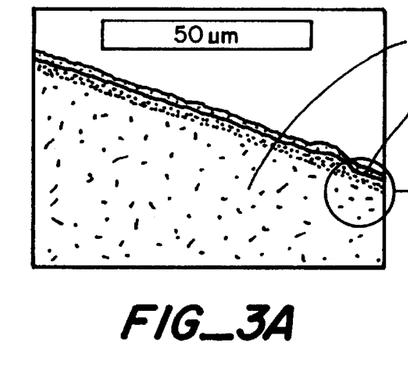
FIG. 3A is an Scanning Electron Microscope (SEM) cross-sectional electron micrograph of the dual-layer supported membrane of the present invention.
Figure 3B:
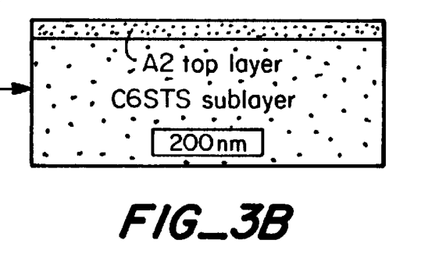
FIG. 3B is a zoomed in Transmission Electron Microscope (TEM) micrograph of the cross-sectional view of the dual-layer supported membrane of FIG. 3A.

The dual silica coated permeable tube results in both high flux and selectivity for the membranes with gradual changes of pore size from 50 Å (commercial γ-alumina support layer) to 10–12 Å (surfactant-templated silica sublayer), and then to 3–4 Å (ultramicroporous silica top-layer). Surfactant templates embedded in the silica framework are removed by calcination while solvent templates are evacuated by a low-temperature thermal treatment under vacuum. FIGS. 3A and 3B show an electron micrograph view of the cross-section and the surface of the supported dual-membrane. The thickness of the defect-free ultramicroporous A2** layer is about 30 μnm.

EXAMPLE 2

Sublayer Effect On Permeation And Separation

2.A.—Test Parameters

Figure 4:
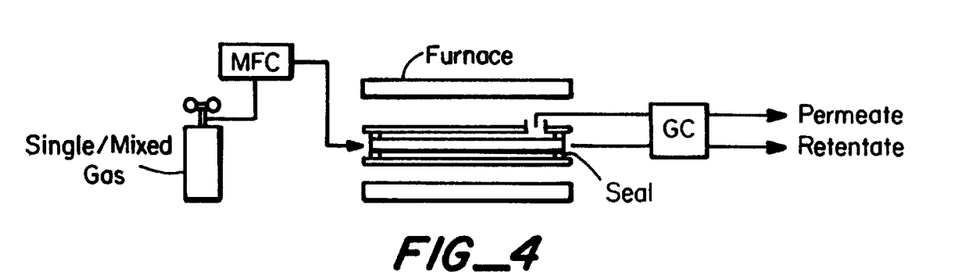
FIG. 4 shows a schematic diagram of the custom built automated flow system utilized in gas permeation measurements.

The gas permeation through the dual-layer membrane produced in 1.C. was measured using a custom built automated flow system as shown in FIG. 4. An outgassing procedure is performed prior to measuring the permeation because ambient moisture can easily condense inside silica micropores. The outgassing procedure was conducted at 80° C. for three hours with dry helium purging across the membrane. The procedure for determining gas permeance included evacuating both sides of the membrane and then introducing pure gas or mixed gas into the tube side of the membrane. Gases were chosen to give a range of gas molecule sizes. Single components of $He$, $H_2$, $CO_2$, $CO$, $N_2$, and $CH_4$, and either its dual or multiple component mixture were tested. The pressure at the tube side was maintained at a constant pressure (6.5 bar). Meanwhile, the shell-side pressure was gradually built up due to permeated gases. Upon exceeding atmosphere pressure, the shell side was exposed to ambient pressure. To simulate practical operation, no sweeping gas was used in all experiments and, therefore, the problems of back diffusional flux were eliminated.

The flow rates of all inlet and outlet streams were directly measured by digital bubble flow meters (Humonics). If the permeate flow rate was below the detectable limit of the digital bubble flow meter (~1 cc/min), it could be calculated from the rate of pressure increase at a pre-vacuumed permeate side with a closed outlet.

For mixed-gas permeation measurement, a pre-mixed gas with known composition was used and the compositions of both effluent streams were analyzed as functions of time using an on-line gas chromatograph. The flow rate and the pressure of the tube-side stream as well as the temperature of the membrane separator were varied. The experiments were continued until steady-state conditions (no change in flow rates and compositions with time) were reached. The change of gas-phase driving force (the partial-pressure gradient of component i, $\Delta P_i$, across the membrane) along the membrane was taken into account; therefore, the permeance of the component i, $P_{m,i}$, was defined as:

$$P_{m,i} = \frac{J_i}{\Delta P_{\ln,i}}$$

where $$\Delta P_{\ln,i} = \frac{(\Delta P_i)^I - (\Delta P_i)^{II}}{\ln\{(\Delta P_i)^I / (\Delta P_i)^{II}\}}$$

where $J_i$ is the steady-state flux of component i through the membrane. $(\Delta P_i)^I$ and $(\Delta P_i)^{II}$ are the partial-pressure differences of component i between the tube-side and shell-side pressures of the membrane at the gas entrance (I) and exit (II) ends, respectively.

The separation factor defined by the ratio of permeabilities can be equivalent to the ratio of permeances if the membrane thickness is identical. Thus, for pure-gas permeation, the ideal separation factor $\alpha_I$ could be defined by the ratio of permeances of individual pure gases. Analogous to the definition of $\alpha_I$, the true separation factor $\alpha_t$ of mixed gas is defined by the ratio of permeances of constituent gases.

2.B.—Ultramicroporous Silica Membrane with Microporous C6STS Sublayer

A coated membrane support as produced in 1.C. utilizing the C6STS sol as prepared in 1.B.1. is characterized using a single gas permeability measurement system. The membrane ends were sealed using Viton® or Grafoil® gasket material, and the compression of the gasket avoided by-passing of the gases. A custom built automated flow system, as described above in 2.A. was used to measure the permeance (flux/pressure) of five different gases through the membrane. The gases were chosen to give a range of gas molecule sizes. These gases, along with their characteristic diameters, are: He (2.65 Å), $H_2$ (2.89 Å), $CO_2$ (3.3 Å), $N_2$ (3.64 Å), and $CH_4$ (3.8 Å). Apart from the different sizes, the inert gases have different chemical interactions with the membrane surface. Thus, the flow through the membrane will be a combination of Knudsen diffusion, surface diffusion and micropore diffusion. The relative contribution from each of the above flow mechanisms varies according to the gas, as well as the pore size of the membrane.

The flow through the membranes was measured with two bubble meters installed on the exhaust line. The results obtained from the single gas permeability measurements were reported as permeance ($cm^3/cm^2$-s-cm-Hg) vs measurement temperature and the ideal selectivity $\alpha_{1/2}$ (flux of pure gas 1/flux of pure gas 2) vs. temperature.

Figure 5A:
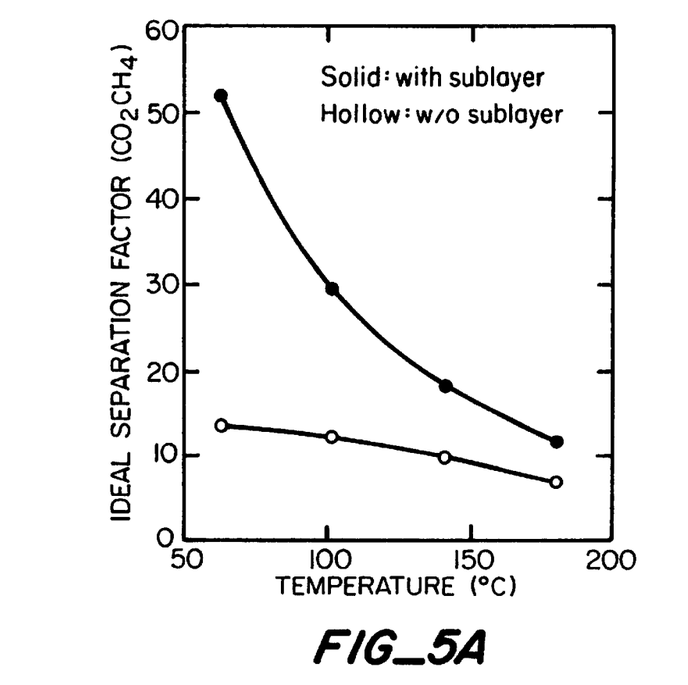
FIG. 5A is a graphical representation of the separation factor versus temperature comparing microporous sieving A2** layer with and without a surfactant-templated intermediate layer.
Figure 5B:
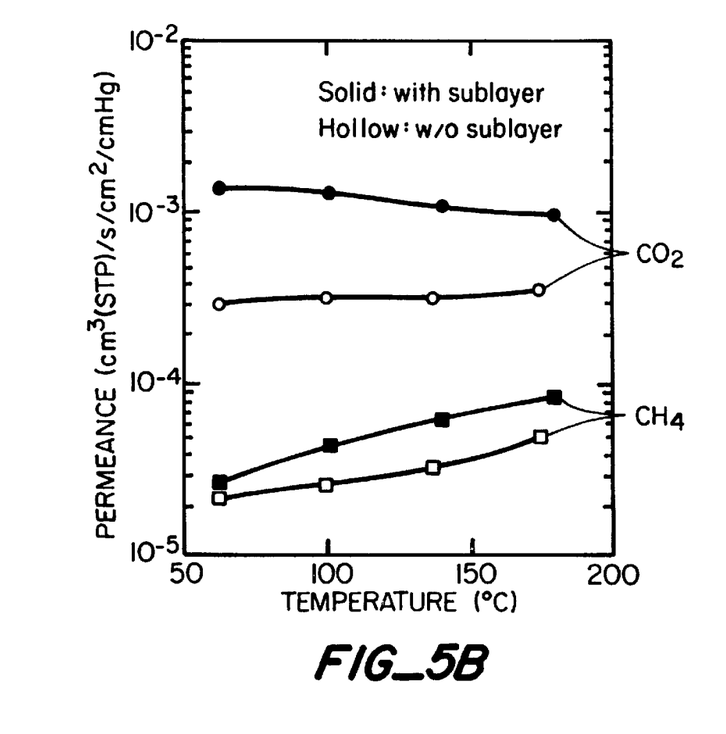
FIG. 5B is a graphical representation of gas permeances versus temperature comparing the A2** membrane with or without a mesoporous sublayer.
Figure 6:
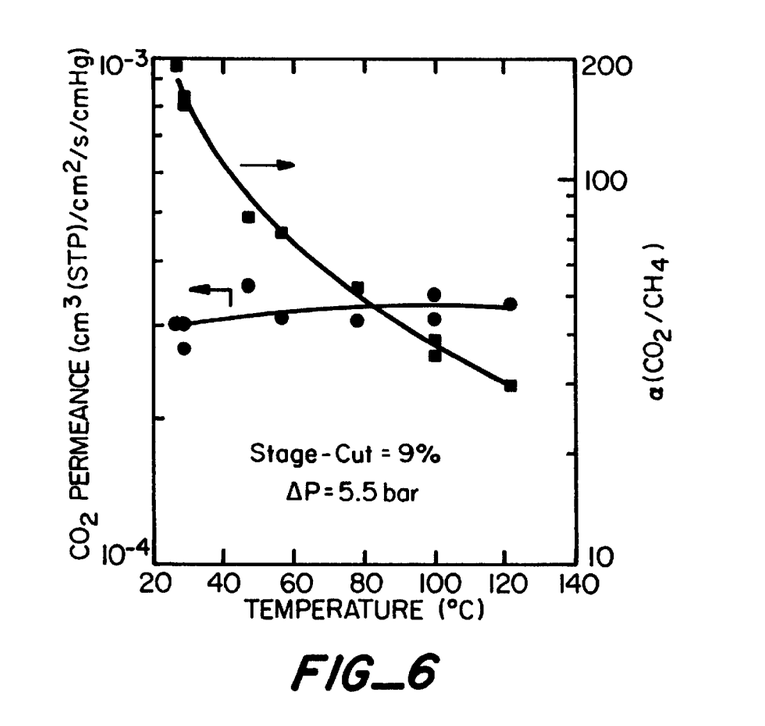
FIG. 6 is a graphical representation of the $CO_2$ permeance and $CO_2/CH_4$ separation factor $\alpha$ as a function of temperature for separation of 50/50 (v/v) $CO_2/CH_4$ gas mixture.

The C6STS sublayer as prepared serves to eliminate intrinsic defects on commercial porous supports and promotes pore uniformity; therefore increasing selectivity, and preventing penetration of a subsequently deposited ultramicroporous membrane (e.g. A2 membrane with an average pore size of about 3–4 Å as described in 1.D.), thus enhancing flux. Gas permeances and selectivities were compared for A2 membranes with and without a C6STS sublayer. Referring to FIGS. 5A and 5B, at 60° C., the membrane with a sublayer exhibited four-fold higher $CO_2$ permeances and four-fold higher $CO_2/CH_4$ selectivities than that without a sublayer in a single-component gas permeation measurement. Ideal separation factors of various gas pairs (e.g. $\alpha_I(CO_2/CH_4)$=102 at 25° C.) largely exceeded Knudsen separation factors (e.g. $\alpha_K(CO_2/CH_4)$=0.6). The exceptional negative activation energy of $CO_2$ ($E_a$=−3.37 KJ/mol) for the membrane with a C6STS sublayer indicated the occurrence of $CO_2$ capillary condensation. Therefore, $CO_2$ is transported with high density through narrow pores at lower temperatures. On the contrary, $CO_2$ capillary condensation was insignificant for the membrane without a C6STS sublayer. Therefore, a gradual increase in $CO_2$ permeance with temperature (activated transport) is observed ($E_a$=2.48 KJ/mol). Thus, a high $CO_2$ permeance ($3.2\times10^4$ $cm^3$(STP)/s/$cm^2$/cmHg) and a high $CO_2/CH_4$ separation factor of approximately 200 can be achieved with the dual layer membrane at 26° C. for separation of 50/50 (v/v) $CO_2/CH_4$ gas mixture, as shown in FIG. 6. The combination of high permeance and high selectivity exceeded that of prior art gas separation membranes (e.g. asymmetric polyimide with a typical $CO_2/CH_4$ separation factor of 55 and a $CO_2$ permeance of $1.7\times10^{-4}$ $cm^3$(STP)/s/$cm^2$/cm Hg). Moreover, activation energies of $CH_4$ for both A2** membranes with and without a sublayer were 12.92 and 9.64 KJ/mol, respectively, which were higher than those of $CO_2$. $CH_4$ diffused through both the membranes with low permeance via an activated transport mechanism. Referring back to FIG. 5A, the combination of $CO_2$ condensation effect and the activated transport mechanism help in explaining the increase in ideal separation factor of $CO_2/CH_4$ upon the decrease in temperature for the membrane with a sublayer.

2.C.—BTE/TOES Microporous Silica Membrane with a Mesoporous C16STS Sublayer

Figure 7A:
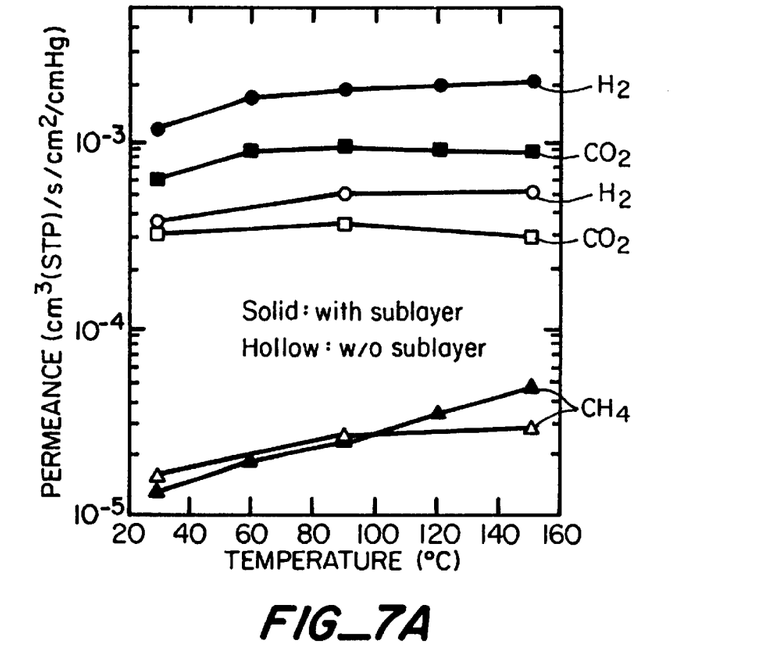
FIG. 7A is a graphical representation of the gas permeances versus temperature of the BTE/TEOS membranes with or without a surfactant-templated intermediate layer.
Figure 7B:
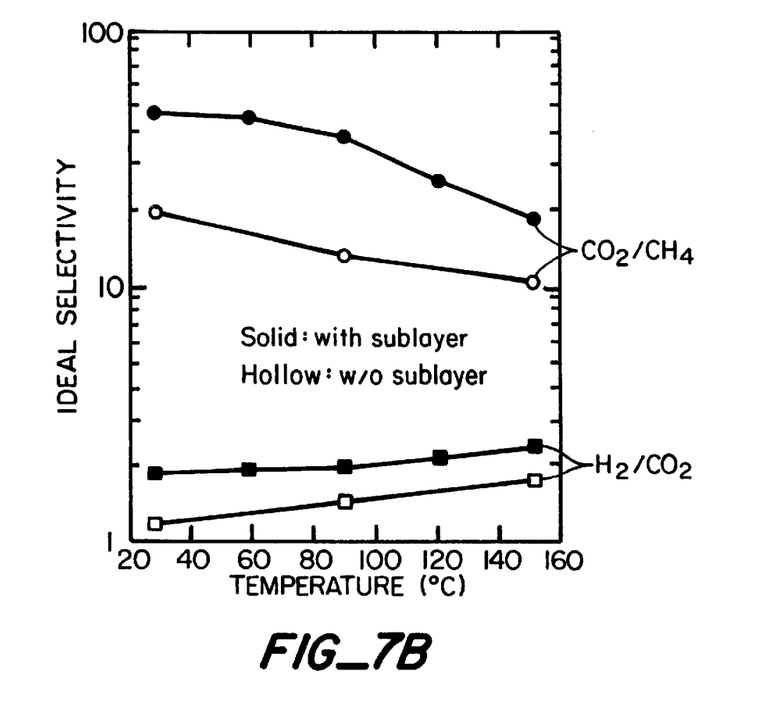
FIG. 7B is a graphical representation of the selectivities versus temperature of the BTE/TEOS membranes with or without a surfactant-templated mesoporous C16STS intermediate layer.

A membrane support prepared as described in 1.C. utilizing the mesoporous C16STS material as the surfactant-templated silica sublayer as prepared in 1.B.2. shows substantially the same substrate effects as the microporous C6STS materials described above in 2.B. A 5.5 cm commercial 50 Å γ-$Al_2O_3$ membrane tube was initially cleaned by ultrasound, then washed and calcined as described in 1.C. The membrane tube was dip-coated into the surfactant-templated sol as described in 1.C.1. utilizing the C16STS sol as prepared in 1.B.2. The C16-surfactant was then removed by heating the C16STS coated support at a rate of 1° C./min. to the target temperature of 500° C. The coated support was held isothermally for three hours and then cooled at a rate of 1° C./min. to 25° C. A microporous membrane was then formed on the calcined membrane support with the C16STS intermediate layer by dip-coating the C16STS coated support into a BTE (Bis(Triethoxysilyl)Ethane) silica sol as prepared in 1.A.4. and filtered utilizing 0.45 μm filter (Nalgene) prior to dip-coating. The Ethane ligands (—$CH_2CH_2$—) of the BTE membrane embedded in the silica framework are removed by calcination at 280° C. by heating the BTE coated support at 1° C./min. to the target temperature. The coated support was held isothermally for three hours and then cooled at a rate of 1° C./min. to 25° C., leaving behind a microporous membrane. A comparison of the membranes with and without a mesoporous sublayer is shown in FIGS. 7A and 7B. The results show that membranes with a mesoporous sublayer exhibit significantly higher permeance and significantly better selectivity than those without a sublayer. This is consistent with the observation in Example 2.B., demonstrating the crucial role of the sublayer in improving flux and selectivity of an overlying microporous silica membrane.

2.D.—Alternative Intermediate Layers

The same concept of providing a microporous or mesoporous intermediate layer can be applied to the use of an ordered mesoporous silica membrane as a sublayer to minimize transport resistance. An amphiphilic block copolymer (Brij56, $CH_3(CH_2)_{15}(CH_2CH_2O)_{10}OH$, 4 wt %) was used as a templating agent in replace of surfactants as prepared and described in 1.B.4. The copolyer sol is deposited onto substrate as described in 1.C.1. To facilitate re-organization of the block-copolymer template, the coating of the substrate with the copolymer sol is performed in a humid chamber of 40% relative humidity at a temperature of 25° C. The block copolymer template silica results in a high porosity (50–65%) and ordered cubic structure having uniform pore size of about 23 Å. Therefore, the block-copolymer is another candidate which can be used as the intermediate layer for a subsequently deposited effective separation layer, such as A2**.

EXAMPLE 3

Effects of the Ultramicroporous Silica Membrane Calcined at 450° C.

3.A.—Ultramicroporous Silica Membrane for Hydrogen Purification

Figure 8:
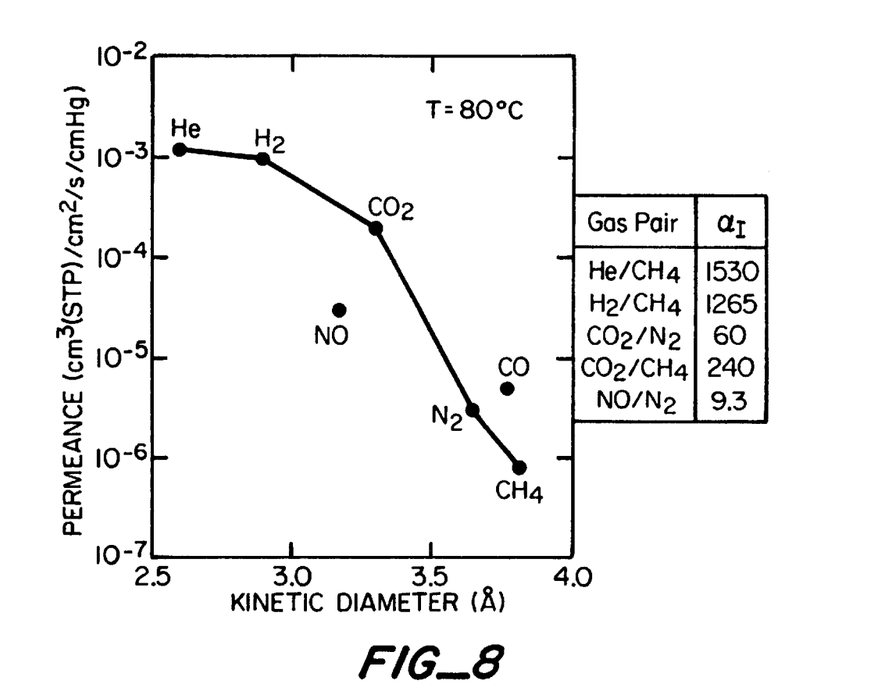
FIG. 8 is a graphical representation of the gas permeance versus molecular diameter of a variety of molecules of a dual-layer supported membrane after calcination at 450° C.

A dual layered membrane as prepared in 1.C.3. was calcined at the 450° C. for one hour in air and cooled at a rate of 1° C./min. to 25° C. Single-component gas permeation measurements were taken utilizing the measurement system as described in 2.A. at various temperatures ranging from 20° C. to 150° C. Pure-gas permeation results at 80° C. are shown in FIG. 8. Due to the extended calcination for one hour at 450° C., the pore size of the membrane was further reduced, resulting in a sharp molecular-size cut-off at about 3.5 Å. The dual layer membrane support obtained through the extended calcination at 450° C. results in a superior hydrogen separation factor ($H_2/CH_4$=1265) as well as having a high hydrogen permeance ($1\times10^{-3}$ $cm^3$(STP)/$cm^2$/s/cmHg). Such a selective membrane provides a great opportunity in applications such as hydrogen recovery from petrochemical plants and hydrogen purification for fuel cells. The membrane selectively separated hydrogen from a simulated reformate gas mixture consisting of 33.98% $N_2$, 15.00% $CO_2$, 0.997% CO, 50.023% $H_2$ (composition produced by the partial oxidation of methanol) for fuel cells as evidenced by the high concentration of hydrogen recovered in the permeate side stream as shown in Table 1.

TABLE 1

Permeances of components of a gas mixture* at 80° C.

| Gas i | Permeance × $10^6$ ($cm^3$(STP)/s/ $cm^2$/c/cmHg) | Separation Factor ($H_2$/Gas i) | Pure gas permeance ratio | Permeate (mole %) | Retentate (mole %) |
|---|---|---|---|---|---|
| $H_2$ | 507 | — | — | 92.19 | 42.25 |
| $CO_2$ | 101 | 5.0 | 5.2 | 7.36 | 16.89 |
| $N_2$ | 2.15 | 235.9 | 316.0 | 0.37 | 40.47 |
| CO | 3.83 | 132.2 | 198.6 | 0.0193 | 1.14 |

*50.023% $H_2$, 15% $CO_2$, 33.98% $N_2$, 0.997% CO; Tube-side pressure = 6.5 bar; Stage-cut = 8.2%.

A 92 mole% $H_2$ purity was obtained in the permeate stream at a stage-cut of 8.2% (stage-cut=the ratio of permeate flow rate to feed flow rate). The CO concentration (CO is a known PEM fulel cell poison) in the permeate reduced to at least fifty times lower than that in the feed. A high $H_2$ permeance ($6 \times 10^{-4}$(STP)/$cm^2$/s/cmHg) and a high $H_2$/$N_2$ separation factor of over 270 for separation of a 50/50 (v/v) $H_2$/$N_2$ gas mixture were achieved as shown in Table 2.

TABLE 2

The use of a AC450 silica membrane for separation of a 50/50 (v/v) $H_2$/$N_2$ gas mixture* at 80° C.

| Gas i | Permeance × $10^6$ ($cm^3$(STP)/s/ $cm^2$/c/cmHg) | Separation Factor ($H_2$/Gas i) | Pure gas permeance ratio | Permeate (mole %) | Retentate (mole %) |
|---|---|---|---|---|---|
| $H_2$ | 606 | — | — | 99.41 | 37.43 |
| $N_2$ | 2.21 | 274.5 | 316.0 | 0.59 | 62.57 |

*50.023% $H_2$, 15% $CO_2$, 33.98% $N_2$, 0.997% CO; Tube-side pressure = 6.5 bar; Stage-cut = 11%.

Besides H2 purification, the membrane can also be applied to $NO_x$ removal from fuel gas. A single-component permeation measurement was also performed in which NO/$NO_2$ selectivity was measured to be 9.3 $cm^3$(STP)/$cm^2$/s/cmHg and NO permeance reached $3 \times 10^{-5}$ $cm^3$(STP)/$cm^2$/s/cmHg.

3.B.—Comparison of the Ultramicroporous Silica Membrane

Figure 9:
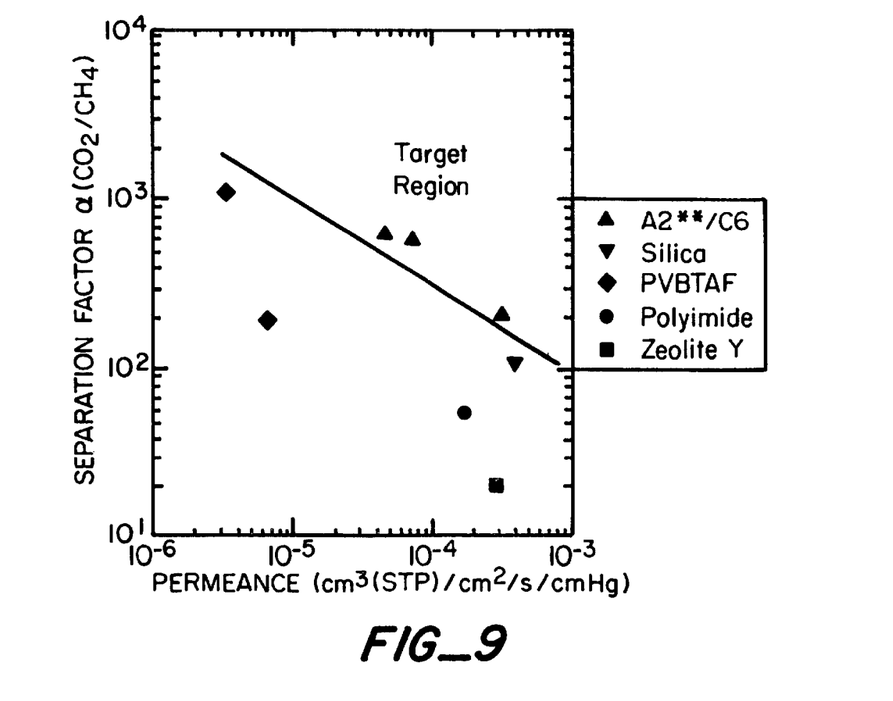
FIG. 9 is a graphical representation of the separation factor versus permeance of the dual-layer supported membrane of the present invention in comparison to prior art membranes.

A dual-layer supported membrane as prepared in 3.A. was further compared to prior art molecular sieving methods and devices. Operating at 26° C., a moderate pressure gradient ($\Delta P=5.5$ bar), and high feed flow rate (~500 $cm^3$ (STP)/min), a high $CO_2$ permeance of about $3.2 \times 10^{-4}$ $cm^3$(STP)/s/$cm^2$/cmHg and a high $CO_2$/$CH_4$ separation factor of over 200 was achieved for the separation of 50/50 (v/v) $CO_2$/$CH_4$ gas mixture, as shown in FIG. 9. Still referring to FIG. 9, the A2 membrane as prepared in 1.C.2. without further calcination, results in a combination of high permeance and high selectivity which is superior to prior art separation membranes. The A2 membrane as prepared in 3.A. with further calcination results in a higher $CO_2$/$CH_4$ separation factor (~600) at the expense of $CO_2$ permeance. The comparisons are made under the assumption that the best membrane performance was reported under their optimal operation conditions for each membrane.

EXAMPLE 4

Permeance and $CO_2$$CH_4$ Separation Factor as Function of Feed Flow Rate, Temperature and Pressure Gradient The effect of temperature, flow rate and pressure gradient across the membrane on both $CO_2$ permeance and $CO_2$/$CH_4$ separation factor was investigated via mixed-gas permeation experiments. Mixed-gas permeation experiments representing the true separation were conducted with 50/50 (v/v) $CO_2$/$CH_4$ feed gas under steady-state conditions.

4.A.—Feed Flow-Rate Effects.

Figure 10A:
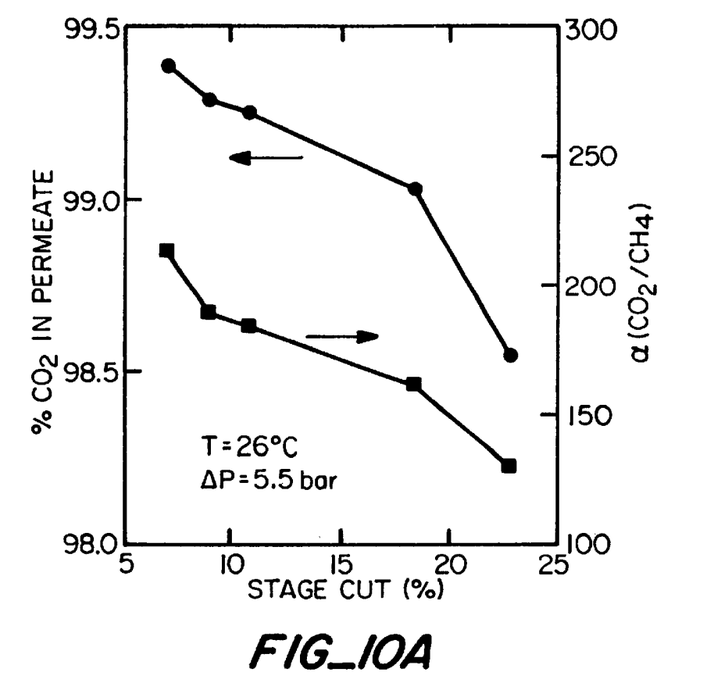
FIG. 10A is a graphical representation of the %$CO_2$ in permeate and $CO_2/CH_4$ separation factor versus stage cut of a dual-layer supported A2** membrane.
Figure 10B:
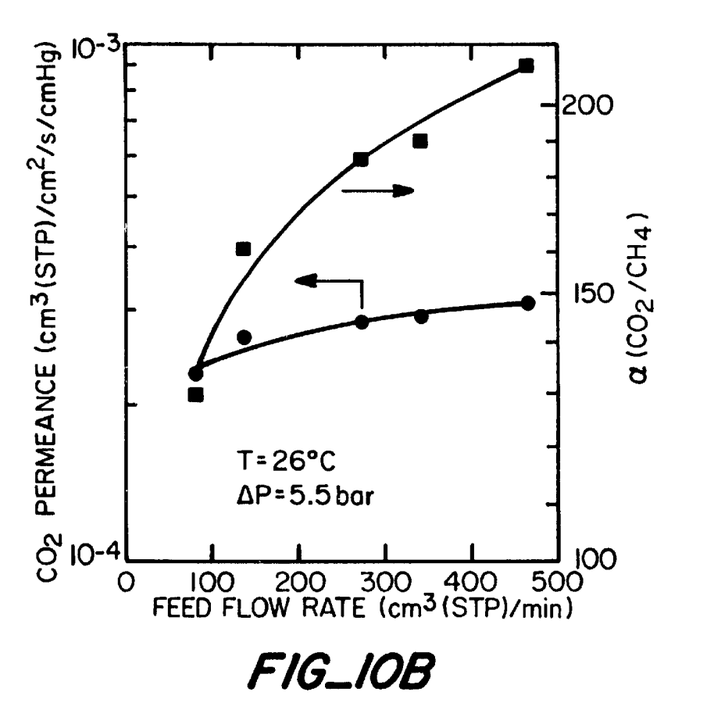
FIG. 10B is a graphical representation of the $CO_2$ permeance and $CO_2/CH_4$ separation factor versus feed flowrate of a dual-layer supported A2** membrane.

A 5.5 cm commercial 50 Å $\gamma$-$Al_2O_3$ membrane tube prepared as described in 1.C. was dip-coated into the surfactant-template sol as described in 1.C.1. utilizing the C6STS sol as prepared in 1.B.1. The C6STS coated membrane was then dip-coated in an A2** sol as described in 1.C.2. The experiment for feed flow-rate effect was operated at a constant temperature of 26° C. and a constant pressure gradient of $\Delta P=5.5$ bar across the membrane. The stage cut $\theta$, defined as the ratio of permeate flow rate to feed flow rate, represents the fraction of feed gas permeated through the membrane (gas recovery ratio). Referring to FIGS. 10A and 10B, it is shown that the stage cut $\theta$ decreases with the increase in the feed flow rate. The decrease in the stage cut $\theta$ resulted in the increase in the $CO_2$/$CH_4$ separation factor, $\alpha(CO_2/CH_4)$, as shown in FIG. 10A. Thus, higher purity of $CO_2$ was recovered at the permeate side at the lower stage cut $\theta$. In a high feed flow rate (low stage cut), the concentration of the fast permeating gas, $CO_2$, remained high at retentate, as shown in FIG. 10B. Therefore, a high $CO_2$ driving force across the membrane was maintained. In addition, $CO_2$ is allowed to pass through pores with little chance of being blocked by the larger $CH_4$ molecules. Alternatively, the $CH_4$ driving force across the membrane increases with the decrease in feed flow rate, resulting in a lower $\alpha(CO_2/CH_4)$. High $\alpha(CO_2/CH_4)$ can be obtained at high feed flow rates but at the expense of both low gas recovery ratio and pumping energy. The maximum $\alpha(CO_2/CH_4)$ at a fixed temperature and pressure in the tubular membrane can be achieved when the retentate compositions are equivalent to the feed compositions. Moreover, due to selective adsorption of $CO_2$ at lower temperatures, the mixed-gas $\alpha(CO_2/CH_4)$ is higher than the single-component separation factor, $\alpha_1(CO_2/CH_4)$, under identical operating conditions. The selectively adsorbed $CO_2$ would either cover the pore entrance or further reduce the size of the pore opening, depending on the size of pores, thus preventing $CH_4$ from permeating through the pores.

4.B.—Temperature Effects.

A dual-layer membrane as prepared in 4.A. was subjected to a constant feed flow-rate represented by a stage-cut of 9% and a constant pressure gradient of $\Delta P=5.5$ bar across the membrane while the temperature was varied from 26° C. to 120° C. The value of the $CO_2$ permeance and the separation factor, $\alpha(CO_2/CH_4)$, are inversely related as the temperature increases. FIG. 6 shows that the $\alpha(CO_2/CH_4)$ decreases with the increase in temperature, while the $CO_2$ permeance increases slightly with the increase in temperature. The abrupt increase in the $\alpha(CO_2/CH_4)$ at lower temperatures was due to the combined effects of activated transport and $CO_2$ selective adsorption where the capability of $CO_2$ adsorption on to silica surfaces diminishes at higher temperature. Due to the $CO_2$ selective adsorption effect, the $\alpha(CO_2/CH_4)$ for mixed gas at lower temperature is higher than the $CO_2$ separation factor for a single-component gas, $\alpha_1(CO_2/CH_4)$. The difference between $\alpha(CO_2/CH_4)$ and $\alpha_1(CO_2/CH_4)$ vanishes at higher temperatures as can be seen in comparing FIG. 5A to FIG. 6.

4.C.—The Effects of Pressure.

Figure 11:
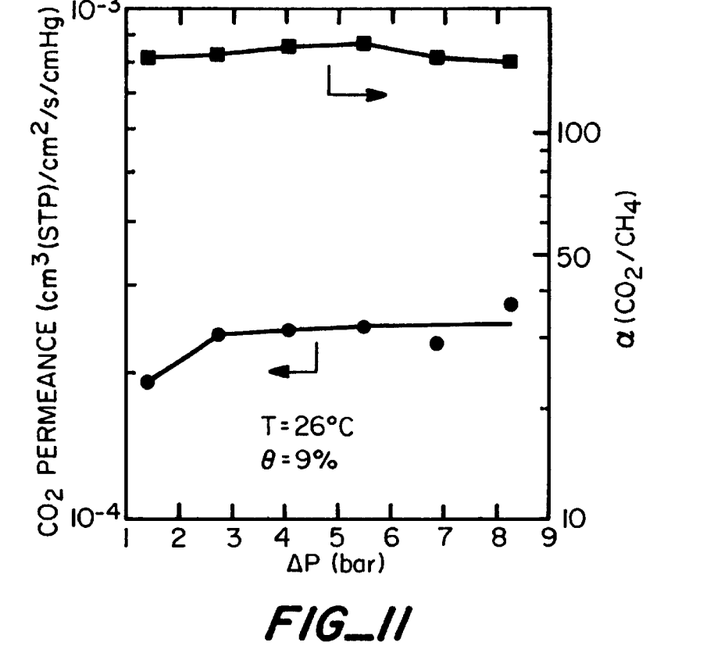
FIG. 11 is a graphical representation of the $CO_2$ permeance and $CO_2/CH_4$ separation factor versus change in pressure of a dual-layer supported A2** membrane.

The effects of pressure on $CO_2$ permeance through a dual-layer membrane was determined. The membrane, as prepared in 4.A., was subjected to a constant feed flow-rate, represented by a stage-cut of 9%, and a constant temperature of 26° C. The retentate pressure was varied while permeate pressure was kept at ambient atmospheric pressure. Referring to FIG. 11 it can be seen that the $\alpha(CO_2/CH_4)$ is essentially independent of the pressure gradient while the $CO_2$ permeance slightly increases with pressure gradient and then levels off at a higher pressure gradient. The increase in $CO_2$ permeance at the lower pressure gradient is indicative of the startup of $CO_2$ adsorption inside the pores. Once the $CO_2$ is adsorbed on the pore walls, the $CO_2$ permeance obeys Henry adsorption characteristics such that the $CO_2$ permeance is independent of the pressure gradient across the membrane.

4.D.—Effects of Continuous Operation.

Figure 12:
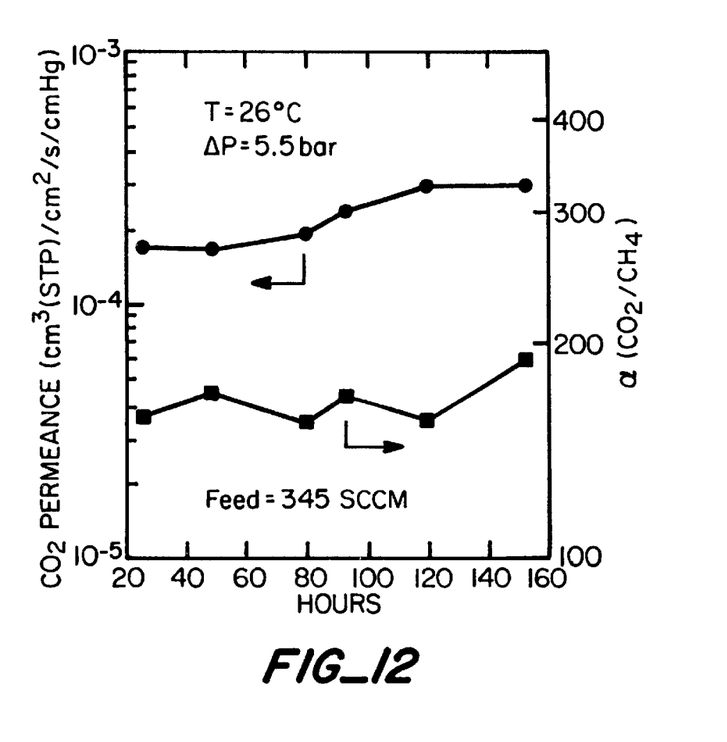
FIG. 12 is a graphical representation of the $CO_2$ permeance and $CO_2/CH_4$ separation factor versus time of operation of a dual-layer supported A2** membrane.

A membrane, as prepared in 4.A., was continuously operated for 150 hours at a constant temperature, pressure gradient, and feed flow rate conditions. Referring to FIG. 12, the $CO_2$ permeance and separation factor, $\alpha(CO_2/CH_4)$, gradually increase with time. This is due to a gradual removal of adsorbed pore fluid by an extensive gas permeation. Nevertheless, stable and continuous operation is achieved at a temperature of 26° C.

The foregoing description of a specific embodiment of the present invention is presented for the purposes of illustration and description. It is not intended to be exhaustive or to limit the invention to the precise form disclosed; obviously many modifications and variations are possible in view of the above teachings. The embodiment was chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An inorganic microporous supported membrane, comprising:

a macroporous support;

a templated porous intermediate layer coating the support, said porous intermediate layer having an average pore size of less than about 20 Å;

a microporous layer coating the templated porous intermediate layer such that the microporous layer is capable of molecular sieving, said microporous layer having an average pore size of less than about 5 Å, wherein said inorganic microporous supported membrane has a thickness in the range of 10 nm to 200 nm.

2. The inorganic microporous supported membrane as claimed in claim 1, wherein:

the templated porous intermediate layer is an inorganic surfactant-templated asilica layer; and the microporous layer is an inorganic silica layer.

3. The inorganic microporous supported membrane as claimed in claim 1, wherein:

the templated porous intermediate layer including an amphiphilic block copolymer.

4. An inorganic microporous supported membrane, comprising:

a porous substrate;

a first inorganic porous membrane coating the substrate having an average pore size of less than about 25 Å; and a second inorganic porous membrane coating the first inorganic membrane having an average pore size of less than about 6 Å wherein said inorganic microporous supported membrane has a thickness in the range of 10 nm to 200 nm.

5. The inorganic microporous supported membrane as claimed in claim 4, wherein:

the first inorganic porous membrane has a pore diameter in a range of about 10 to 20 Å.

6. The inorganic microporous supported membrane as claimed in claim 5, wherein:

the first inorganic porous membrane includes a surfactant-templated material.

7. The inorganic microporous supported membrane as claimed in claim 6, wherein:

the surfactant-templated material is prepared from silica polymers and a surfactant powder.

8. The inorganic microporous supported membrane as claimed in claim 4, wherein:

the second inorganic porous membrane is an inorganic silica membrane.

9. The inorganic microporous supported membrane as claimed in claim 4, wherein:

the first inorganic porous membrane has a thickness of less than about 100 Å.

10. The inorganic microporous supported membrane as claimed in claim 4, wherein:

the second inorganic porous membrane has an average pore size of between 2 and 5 Å.

11. The inorganic microporous supported membrane as claimed in claim 4, wherein:

the second inorganic porous membrane has an average pore size of between 3 and 4 Å.

12. The inorganic microporous supported membrane as claimed in claim 4, wherein:

the second inorganic porous membrane has a thickness less than about 100 nm.

13. The inorganic microporous supported membrane as claimed in claim 4, wherein the porous substrate is an alumina substrate.

14. The inorganic microporous supported membrane as claimed in claim 5, wherein:

the porous substrate has an average pore diameter ranging between 30 to 60 Å.

* * * * *